June 25, 1957  F. M. WINN, JR., ET AL  2,797,070
MATERIALS BLENDING AND DISPENSING APPARATUS
Filed Oct. 31, 1955
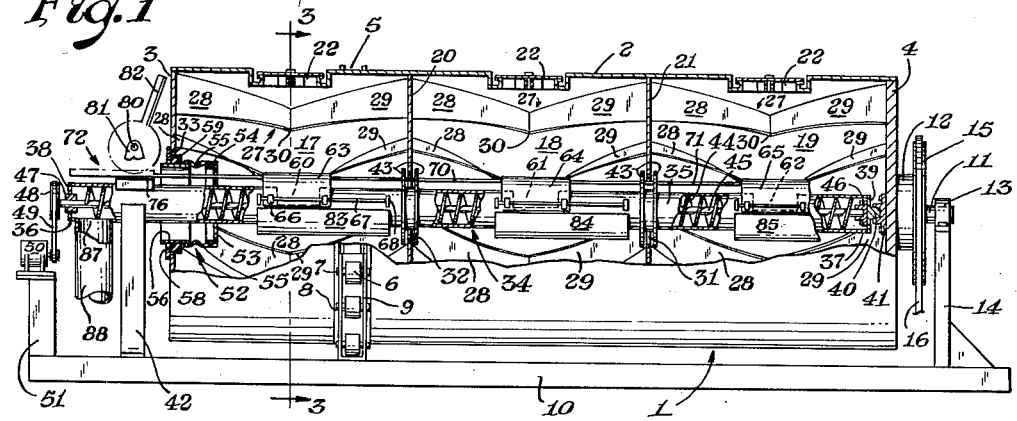
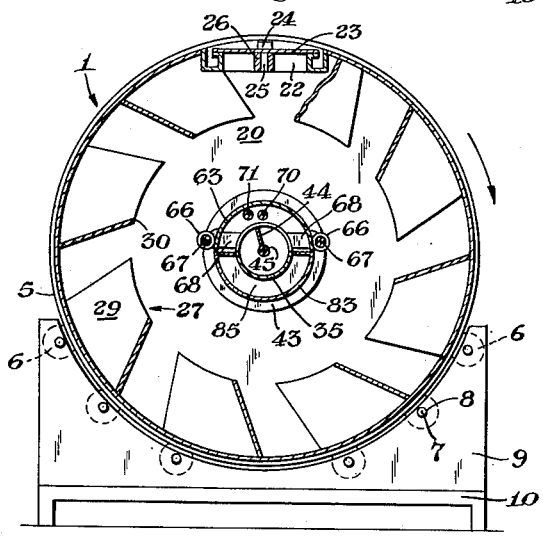
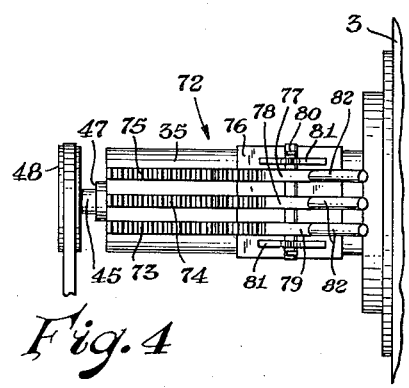
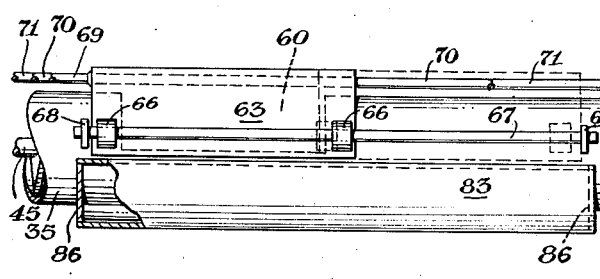
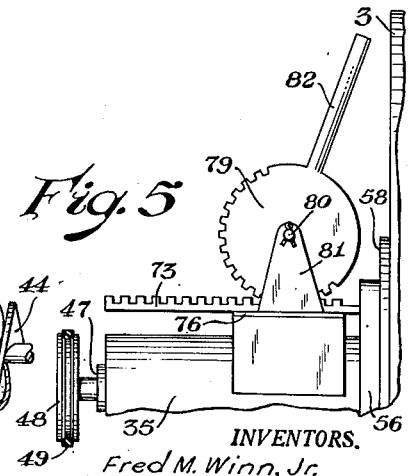
INVENTORS.
Fred M. Winn, Jr.
BY Cleve W. Stoskopf
Griswold & Burdick
ATTORNEYS

United States Patent Office 2,797,070
Patented June 25, 1957

2,797,070

MATERIALS BLENDING AND DISPENSING APPARATUS

Fred M. Winn, Jr., and Cleve W. Stoskopf, Tulsa, Okla., assignors to The Dow Chemical Company, Midland, Mich., a corporation of Delaware Application October 31, 1955, Serial No. 543,657

4 Claims. (Cl. 259—3)

The invention relates to apparatus for blending materials and dispensing them. It more particularly concerns an improved blending device in which a plurality of blends of particulated or other materials may be made and therefrom dispensed.

One of the objects of the invention is to provide an apparatus which is portable and capable of producing simultaneously a plurality of blends of particulated solids and dispensing the blends individually as desired and at rates which can be varied as desired. Other objects and advantages will appear as the description of the invention proceeds.

The invention is embodied in the example herein shown in the accompanying drawing and described.

In the said drawing, Fig. 1 is a side elevation partly in section of the apparatus with parts cut away to show structure.

Fig. 2 is an enlarged fragmentary view of a portion of Fig. 1.

Fig. 3 is a cross section taken on the line 3—3 of Fig. 1.

Fig. 4 is a plan view of a portion of Fig. 1.

Fig. 5 is a side elevation of the portion shown in Fig. 4.

The apparatus shown comprises a cylindrical vessel indicated generally by numeral 1. The vessel is formed of a cylinder 2 closed at the ends by end walls 3 and 4, respectively. Encircling the cylinder near one end is a channel 5. This rests on the rollers 6 which are provided with axles 7. The axles operate in bearings 8 in the support 9 which is carried on the frame or base 10. At the opposite end of the cylinder, the vessel is supported by an axle 11 attached to the end wall 4 by a boss 12. The axle 11 is carried by bearing 13 which is mounted on the support 14 attached to the frame 10. A drive means in the form of a belt pulley 15 is secured to the boss 12 and by means of a belt 16 connected to a motor (not shown) the vessel 1 may be revolved about its longitudinal axis.

As shown, the vessel is divided into three compartments, 17, 18, and 19, by partitions 20 and 21. Each compartment is provided with a filler opening 22. Each filler opening is provided with a removable cover 23 which is held in place by a nut 24 on bolt 25, extending through the cover, secured to the cross member 26 spanning the opening 22.

Each compartment is provided with a series of baffles, indicated generally by numeral 27, symmetrically disposed around the inner cylindrical wall of the vessel. As shown, the baffles are in pairs, as oblong blades 28 and 29. These are fastened along one of their longer edges to the inside wall of the vessel with one end of each in the pair meeting together forming a flat V, the apex 30 of each V being midway between the end walls of the compartment.

Extending along the longitudinal axis of the vessel from end wall 4 through openings 31 and 32 in partitions 21 and 20 and opening 33 in end wall 3 is a conveyor, indicated generally by numeral 34. The conveyor comprises a conduit, as a tube 35, closed at the ends 36 and 37 with end pieces 38 and 39, respectively. The inner end 37 is provided with a support in the form of a short shaft 40 attached to the end piece 39. The shaft 40 is supported in the bearing 41 which is mounted on the end wall 4. The outer end 36 of the conveyor is secured to and carried on support 42 which is mounted on the frame 10. Secured to the tube 35 are flanges 43, one on each side of a partition, over openings 31 and 32, respectively. The flanges are placed close to the partitions and made wide enough to cover the openings 31 and 32 so as to reduce the tendency for material in one compartment to pass to another through the openings between the compartments. If desired, the flanges may be faced with rubber or other suitable resilient material, not shown, making contact with the partition to provide a seal between the partitions and the outside of the tube.

Inside the tube 35 and forming a part of the conveyor is a conveyor screw 44 having an axle portion 45. One end of the axle is journalled in a bearing 46 mounted on the inside of the end piece 39, the other end of the axle extends through bearing 47 in end piece 38. A pulley 48 secured to the axle is driven by belt 49 from motor 50 which is mounted on a support 51 secured to the frame 10.

Near the outer end of the conveyor is a flexibly mounted seal, indicated generally by numeral 52. This comprises a flange 53, secured to the tube 35, to the periphery of which is secured the cylindrical section 54. One end of a flexible sleeve 55 of resilient material, e. g. fabric reinforced rubber tubing, is tightly fitted over the cylindrical section 54; the other end is tightly fitted over another cylindrical section 56 which extends through the opening 33 of the end wall 3. Around the opening 33 is a flat ring 58 secured to the end wall 3. Ring 58 carries a ring 59 of resilient material which presses against and forms a seal with the cylindrical section 56. Seal 52 allows the vessel to revolve about the stationary conveyor 34 and prevents leakage from compartment 17 to the outside. The flexible sleeve 55 allows section 56 to wabble in the event the opening 33 is not concentric with the axis of rotation of the vessel 1.

Openings 60, 61, and 62 are provided in the upper side of tube 35 in each compartment 17, 18, and 19, respectively (see Fig. 2), through which material in a compartment may pass into the tube 35. Each opening is provided with a sliding cover 63, 64, and 65, respectively. Each cover is provided with a pair of bosses 66 on each side. These are supported by bars 67 which pass through openings in the bosses as shown. The bars are mounted on the tube 35 by brackets 68. To each cover is secured an actuator rod by means of which the cover can be pushed to the right to uncover beneath it the opening in the tube, as indicated by dotted lines in Fig. 2, and thereafter returned to the covering position when desired by movement to the left. In this movement, the bosses 66 slide on the bars 67. As shown, cover 63 is actuated by rod 69, cover 64 by rod 70, and cover 65 by rod 71. Rods 69, 70, and 71 extend through openings in the flange 53 to the outside of the vessel where means, indicated generally by numeral 72, are provided for actuating the rods. As shown, the actuating means comprises racks 73, 74, and 75, one for each of the rods 69, 70, and 71, respectively. The racks are supported by a platform 76 secured to the tube 35. Each rack is actuated by a pinion 77, 78, 79, the teeth of which engage the teeth of the corresponding rack. Each pinion is mounted on the shaft 80, the ends of which are supported by the brackets 81 secured to the platform 76. Handles 82 secured to the pinions are provided for turning the pinions whereby the actuator rods and covers attached thereto may be moved. As shown, all three rods pass through flange 53, two of the rods, 70 and 71, pass under cover 63 and through flanges 43 adjacent to partition 20, and one of the rods, viz. 71, passes under cover 64 and through flanges 43 adjacent to partition 21.

Beneath each cover and secured to tube 35 is a baffle 83, 84, and 85, in the form of a tubular half section to match the form of each cover, so that the external configuration of the covers and baffles together is cylindrical as shown. Each of these baffles is substantially twice as long as the cover above it. The opening between the ends of the baffles and the tube is closed by sectional annuli 86.

The end of the conveyor outside the vessel is provided with a discharge opening 87 on the lower side of which may be connected a suitable chute means, as a pipe 88, through which material conveyed by the conveyor screw 44 may be discharged from the conveyor.

In operation when batches of blends of particulated solid materials are to be prepared, the sliding covers 63, 64, and 65 are moved into closing position, if not already there, by pushing the handles 82 to the right as shown in Fig. 5. The materials for each of the batches of blends to be prepared are introduced into the compartments 17, 18, and 19 through the filler openings 22, respectively. The quantity introduced preferably does not exceed that filling the compartments above the level of tube 35. After suitably charging the compartments with the batches of particulated solids to be blended and securing covers 23 in place, the vessel is revolved about its longitudinal axis while in a more or less horizontal position. While no motor means are shown, any suitable source of motive power may be applied the drive means 15 to effect rotation of the vessel at a moderate rate of speed, e. g. 20 R. P. M. As the charged vessel revolves about its longitudinal axis, the materials in each compartment become blended by tumbling and churning about in the compartments as the particles are carried up by and dropped from the baffles 28 and 29. When blending is complete, the resulting blends may be removed from each compartment in any desired sequence. The removal of a blend from any one of the compartments is effected by opening the appropriate cover as by moving the corresponding one of the handles 82 to the left and putting the conveyor screw 44 into operation by starting up motor 50 while the vessel 1 is revolved. When the conveyor screw is operating and the vessel 1 is revolving so that the baffles 28, 29 pick up and drop the blended materials over the openings 60, 61, and 62 in tube 35, it is manifest that discharge of any one of the three blends will occur depending upon which of the three covers 63, 64, and 65 is moved from the closed position. Each compartment may be emptied by the foregoing procedure at a rate which may be set by the rate at which the conveyor screw 44 is revolved.

One type of blending operation for which the apparatus is adapted is the preparation of blends of sands of various particle sizes. Blends of sands of various particle sizes find application in the treatment of oil and gas wells, for example, in the so-called "fracturing treatments" in which sand is injected into the geological formation penetrated by the well bore, the sand being in suspension in a more or less viscous oil or other suitable liquid vehicle during the injection. In carrying out some of these fracturing treatments, a succession of different blends of sands of different particle sizes are used and readily prepared and delivered to the well injection equipment as needed with the apparatus of the instant invention. For example, sands having a particle size ranging between 40 and 60 mesh may be charged into compartment 17; sands having particle sizes ranging from 20 to 40 mesh may be charged into compartment 18; and sands of 10 to 20 mesh may be charged into compartment 19. Revolving the vessel 1 for a time, say 10–20 minutes, ensures the blending of each lot of sand in each compartment. When the so-prepared blends are to be withdrawn, the conveyor screw 44 is set into operation and the appropriate sliding cover 63, 64, or 65 is moved to the open position, thereby allowing the desired blend to fall into the conveyor which then conveys it to the discharge pipe. In similar manner, three blends of Portland cement and aggregate may be prepared and withdrawn in any desired sequence from the apparatus.

Although but three compartments are illustrated, it is apparent that additional compartments of similar construction to those shown could be provided, if desired, thereby making it possible to prepare more than three blends simultaneously. Any suitable form of base or frame may be used. As shown the apparatus may be skidded on frame 10 to the location at which it is to be used but it is apparent that wheels could be provided for the frame, if desired, or the whole apparatus could be mounted upon a truck for transportation. It is to be understood also that the form of the invention herein shown and described is to be taken as a preferred embodiment of the same and that various changes in the shape, size, and arrangement of parts, may be resorted to, without departing from the spirit of the invention or the scope of the subjoined claims.

We claim:

1. A materials blending and dispensing apparatus comprising a cylindrical vessel adapted to revolve about its longitudinal axis; transverse partitions in the vessel dividing it into a plurality of compartments; baffles in each compartment; a closed conveyor in the vessel extending through each compartment to the outside of the vessel along the longitudinal axis thereof and having an uninterrupted passageway from end to end, said conveyor having an opening therein in each compartment permitting materials in the compartments to enter the conveyor through the openings to be conveyed to the outside of the vessel; removable covers for the said openings; actuator means associated with the covers and extending to the outside of the vessel for selectively moving the covers to the open or closed positions.

2. A materials blending and dispensing apparatus comprising a cylindrical vessel adapted to revolve about its longitudinal axis; partitions in the vessel transverse to the longitudinal axis thereof, said partitions dividing the vessel into a plurality of compartments; a plurality of baffles in each compartment; a closed conveyor in the vessel extending through each compartment to the outside of the vessel along the longitudinal axis thereof and having an uninterrupted passageway from end to end, said conveyor having an opening therein within each compartment permitting materials in the compartments to enter the conveyor through the openings to be conveyed to the outside of the vessel; a closure for each said opening; an actuator means attached to each closure and extending to the outside of the vessel adapted to move a closure into and out of closing relationship wtih a corresponding opening.

3. A materials blending and dispensing apparatus comprising a cylindrical vessel adapted to contain the materials; a frame; bearings supporting the vessel permitting it to revolve about its longitudinal axis; partitions in the vessel transverse to the longitudinal axis thereof dividing the vessel into a plurality of compartments, said compartments having closable filler openings; baffles in each compartment secured to the inside wall of the cylindrical vessel; a closed conveyor in the vessel extending through each compartment to the outside of the vessel along the longitudinal axis thereof and having an uninterrupted passageway from end to end, said conveyor having an opening therein within each compartment permitting materials in the compartments to enter the conveyor through the openings to be conveyed outside the vessel; a closure for each said opening of the conveyor; an actuator means attached to each said closure and extending to the outside of the vessel adapted to move a closure into and out of closing relationship with a corresponding opening.

4. A materials blending and dispensing apparatus comprising a cylindrical vessel adapted to contain the materials; a frame; bearings for the vessel supported on the frame permitting the vessel to revolve about its longitudinal axis; partitions in the vessel transverse to the longitudinal axis thereof dividing the vessel into a plurality of compartments; closable filler openings in each compartment; a plurality of baffles symmetrically disposed in each compartment and secured to the inside wall of the cylindrical vessel; a conduit extending along the longitudinal axis of the vessel from the inside of one end of the vessel to the outside of the other end, the inside end of the conduit being closed and said conduit having an opening in the top side within each compartment and having an uninterrupted passageway from end to end; a closure for each said opening of the conduit; an actuator means attached to each said closure and extending to the outside of the vessel adapted to move a closure into and out of closing relationship with a corresponding opening; a support outside the vessel for the end of the conduit outside the vessel; a bearing secured to the inside of the vessel adapted to support the conduit at the end inside the vessel; a conveyor within the conduit adapted to convey material received from the compartments through the openings in the conduit to the outside of the vessel; and drive means for actuating the conveyor as the vessel rotates.

References Cited in the file of this patent
UNITED STATES PATENTS

| | | |
|---|---|---|
| 1,558,580 | Bishop | Oct. 27, 1925 |
| 1,921,685 | Mascetti et al. | Aug. 8, 1933 |
| 1,925,990 | Pampel | Sept. 5, 1933 |